US005813779A

United States Patent [19]

Palmer et al.

[11] Patent Number: 5,813,779

[45] Date of Patent: Sep. 29, 1998

[54] PRINTING APPARATUS HAVING USER KEYS

[75] Inventors: Mathew Richard Palmer, Cottenham; Robert Charles Lewis Day, Fulbourn; Jonathan Peter Tremlett, Tooting, all of United Kingdom

[73] Assignee: Esselte N.V., Sint Niklaas, Belgium

[21] Appl. No.: 692,663

[22] Filed: Aug. 6, 1996

[30] Foreign Application Priority Data

Aug. 25, 1995 [GB] United Kingdom .................. 9517440

[51] Int. Cl.[6] .................................. B41J 5/08; G06F 3/02

[52] U.S. Cl. .................. 400/615.2; 400/485; 364/709.14

[58] Field of Search ................................ 400/580, 615.2, 400/485; 364/709.14, 709.15

[56] References Cited

U.S. PATENT DOCUMENTS

| | | | |
|---|---|---|---|
| 5,109,355 | 4/1992 | Yuno | 364/709 |
| 5,382,100 | 1/1995 | Sakuragi et al. | 400/615.2 |
| 5,393,147 | 2/1995 | Ueno et al. | 400/615.2 |
| 5,409,317 | 4/1995 | Ueno et al. | 400/586 |
| 5,467,433 | 11/1995 | Lamprecht, Jr. et al. | 395/114 |
| 5,483,624 | 1/1996 | Christopher et al. | 395/117 |
| 5,525,184 | 6/1996 | Luff et al. | 156/361 |
| 5,594,838 | 1/1997 | Christopher et al. | 395/117 |
| 5,651,619 | 7/1997 | Nunokawa et al. | 400/83 |

FOREIGN PATENT DOCUMENTS

| | | |
|---|---|---|
| 0 571 734 A | 12/1993 | European Pat. Off. . |
| 0 573 751 A | 12/1993 | European Pat. Off. . |
| 581 734 A1 | 12/1993 | European Pat. Off. . |
| 0 600 593 A | 6/1994 | European Pat. Off. . |
| 0 605 878 A | 7/1994 | European Pat. Off. . |
| 26 27 698 | 12/1977 | Germany . |
| 2 128 005 | 4/1984 | United Kingdom . |
| 0 126 286 | 11/1984 | United Kingdom . |
| 2 189 334 | 10/1987 | United Kingdom . |

*Primary Examiner*—John S. Hilten
*Attorney, Agent, or Firm*—Pennie & Edmonds LLP

[57] ABSTRACT

A printing device (2) for printing an image receiving medium has a printing mechanism and a keyboard (4) having a plurality of data entry keys (6) for entering data for controlling the printing mechanism and a user key (16). Storage means for holding data accessible in response to the data entered at the keyboard (4) is provided. A controller defines an image to be printed on an image receiving medium in dependence on the data accessed in response to the data entered at the keyboard (4) so that the controller operates selectively in one of a plurality of modes of operation. The modes of operation include a normal mode of operation in which at least some of the keys (6) have predetermined functions associated therewith to access predetermined data associated with the predetermined functions. There is also a user determination mode which is entered by activation of the user key (16) in which the user is able to define a user function associated with one or more of the data keys (6) so that the user defined data is held in the storage means to implement the user function. There is also a user defined mode in which the data entry keys (6) are operable to define a label to be printed in accordance with the user defined data.

15 Claims, 4 Drawing Sheets

PRINTING APPARATUS HAVING USER KEYS

FIELD OF INVENTION

The present invention relates to printing apparatus and, in particular is concerned with a tape printing apparatus.

BACKGROUND OF INVENTION

Known tape printing apparatus of the type with which the present invention is generally concerned are disclosed in EP-A-322918 and EP-A-322919 (Brother Kogyo Kabushiki Kaisha) and EP-A-0267890 (Varitronics). The printers each include a printing device having a cassette receiving bay for receiving a cassette or tape holding case. In EP-A-0267890, the tape holding case houses an ink ribbon and a substrate tape, the latter comprising an upper image receiving layer secured to a backing layer by an adhesive. In EP-A-322918 and EP-A-322919, the tape holding case houses an ink ribbon, a transparent image receiving tape and a double-sided adhesive tape which is secured at one of its adhesive coated sides to the image tape after printing and which has a backing layer peelable from its other adhesive coated side. With both these apparatus, the image transfer medium (ink ribbon) and an image receiving tape (substrate) are in the same cassette.

Another type of tape printing apparatus is disclosed in EP-A-578372. In this printing apparatus, the substrate tape is similar to that described in EP-A-0267890 but is housed in its own tape holding case while the ink ribbon is similarly housed in its own tape holding case.

In all these cases, the image receiving tape passes in overlap with the ink ribbon to a print zone consisting of a fixed print head and a platen against which the print head can be pressed to cause an image to transfer from the ink ribbon to the image receiving tape. There are many ways doing this, including dry lettering or dry film impression, but the most usual way at present is by thermal printing where the printhead is heated and the heat causes ink from the ink ribbon to be transferred to the image receiving tape. Alternatively, the print head may be in direct contact with a thermally sensitive image receiving tape whereby when the print head is heated, an image is defined on the image receiving tape.

Typically, tape printing apparatus have a keyboard which allows a user to input data defining a label to be printed on the image receiving tape. Additionally, the keyboard allows the user to select various attributes for the label and for characters included in the label. These label attributes may be boxing, underlining, orientation of printed characters relative to the image receiving tape, label length etc. The character attributes include fonts, character styles for example bold or italics, character sizes, etc. For each label, the various attributes required must be individually selected. This can be a relatively time consuming process involving a relatively large number of key strokes. In particular, certain attributes are selectable via menus which have to be brought up onto the display. A cursor is moved by a user through the menu by activation of a cursor key until the selected attribute is reached. This further increases the number of key strokes required. Not only is the selection of the required attribute time consuming, but errors resulting from the incorrect selection of the wrong attribute are more likely to occur.

Certain tape printing apparatus can be small handheld or desk top devices with a limited number of keys. In general, various symbols or characters are associated with each key, for example numbers, letters and punctuation marks. However, such tape printing apparatus also store a number of other symbols in a table. To select a symbol stored in a table, the table is called up and the user has to move a cursor through the table until the required symbol is located. Accordingly, it can be time consuming to locate and select the required symbol, particularly when a large number of symbols are included in the table. This can be disadvantageous if the symbol is one which is frequently used by the user. The present invention overcome these disadvantages.

SUMMARY OF INVENTION

According to the first aspect of the present invention, there is provided a printing device for printing an image on an image receiving medium comprising:

a printing mechanism;

a keyboard having a plurality of data entry keys for entering data for controlling the printing mechanism, and a user key;

storage means for holding data accessible in response to the data entered at the keyboard;

a controller for defining an image to be printed on the image receiving medium in dependence on the data accessed in response to the data entered at the keyboard, wherein the controller operates selectively in one of a plurality of modes of operation, the modes including:

a normal mode of operation in which at least some of the keys have predetermined functions associated therewith to access predetermined data associated with the predetermined functions;

a user determination mode entered by activation of the user key in which the user is able to define a user function associated with one or more of the data entry keys so that user defined data is held in the storage means to implement the user function; and a user defined mode in which the data entry keys are operable to define a label to be printed in accordance with the user defined data.

By having a user determination mode in which the user is able to define a user function, the operation of the printing device can be modified in accordance with the user's own preference. Thus, embodiments of the present invention are flexible enough to permit the printing device to be operated in a number of different ways. Additionally, the use of user defined functions reduces the number of, for example, keystrokes required to obtain frequently used functions that would otherwise require a relatively large number of keystrokes.

Preferably, the user defined data defines a set of label settings selected by the user in the user determination mode. The set of label settings may comprise a plurality of label attributes and/or character attributes. The label attributes may include at least one of the following attributes: label layout; underlining; boxing; orientation of characters with respect to the image receiving medium; label length; and label format. The character attributes may include at least one of the following attributes: fonts; character styles; character size; and capitalization. As discussed above, in order to select the desired set of label settings for a particular label, a large number of key strokes may be required. By storing a preferred set of label settings, the user can avoid having to reselect a given set of label settings. This is particularly advantageous where the user has a preferred set of label settings or frequently uses the same settings. This may reduce the number of key strokes required in order to obtain the desired set of label settings.

The controller preferably comprises process means operable, when the selected label settings are recalled when the device is in the user defined mode, to provide an image in which the input data entered via the data entry keys is modified in accordance with the selected set of label settings via the data entry means. Thus, the user may for example only need to enter the text of a label and when the selected label settings are recalled, a label including the entered text and having the selected set of label settings can be obtained with a relatively few key strokes. In one embodiment of the present invention, once the selected label settings have been recalled, the selected label settings are the current settings until such time as the user modifies those settings.

Preferably, the user defined data defines a symbol selected by the user from a table of symbols associated with a symbol key. Thus, in those embodiments where a table containing a large number of symbols is associated with a single symbol key, the user can select one or more symbols of his choice. The one or each selected symbol will then be associated with a given key or keys of the keyboard and accordingly can be easily accessed. This is particularly advantageous where a given symbol is frequently used by the user and the symbol table contains a large number of symbols.

The controller may be arranged in the user determination mode to cause the user defined function to be stored in the storage means on activation of a store key. This key may be a specific store key or alternatively may have some other function associated with it. The controller, when in the user defined mode, may be arranged to recall the user function in response to activation of this store key. This is particularly advantageous in those embodiments where the store key has other functions associated therewith. For example the store key may be a number key or the like.

Alternatively, the controller, when in the user defined mode, may be arranged to recall the user function in response to activation of a recall key, different to the store key. The recall key may be a specific recall key or may have some other function associated with it in normal operation of the printing device.

The controller is preferably arranged so that the user defined function is accessed, in the user defined mode, through activation of the user key. By using the user key in order to recall a stored function, as well as in order to enter the user determination mode, the number of keys required can be reduced. Additionally, by having further associated functions associated with the user key, a separate user key may be justified.

The controller may be arranged so that the user defined data in the form of a symbol can be accessed in the user defined mode by activation of the symbol key of the keyboard. This may be followed by activation of the store key in association with which the symbol is stored.

According to a second aspect of the present invention, there is provided a method of defining a user function in a printing device, the method comprising the steps of:

activating a user key of a keyboard of the printing device to define a user determination mode;

activating one or more data entry keys of the keyboard to define a user function associated with one or more data entry keys of the keyboard;

storing user defined data associated with the activated data entry keys in storage means of the printing device to implement the user function;

activating the data entry keys to define a user defined mode, wherein said data entry keys are operable to define a label to be printed in accordance with the user defined data; and printing the label on an image receiving medium.

The user key may be activated before or after the user function has been defined in embodiments of the present invention.

BRIEF DESCRIPTION OF DRAWINGS

For a better understanding of the present invention and as to how the same may be carried into effect, reference will now be made by way of example to the accompanying drawings in which.

DETAILED DESCRIPTION OF PREFERRED EMBODIMENTS

Figure 1:
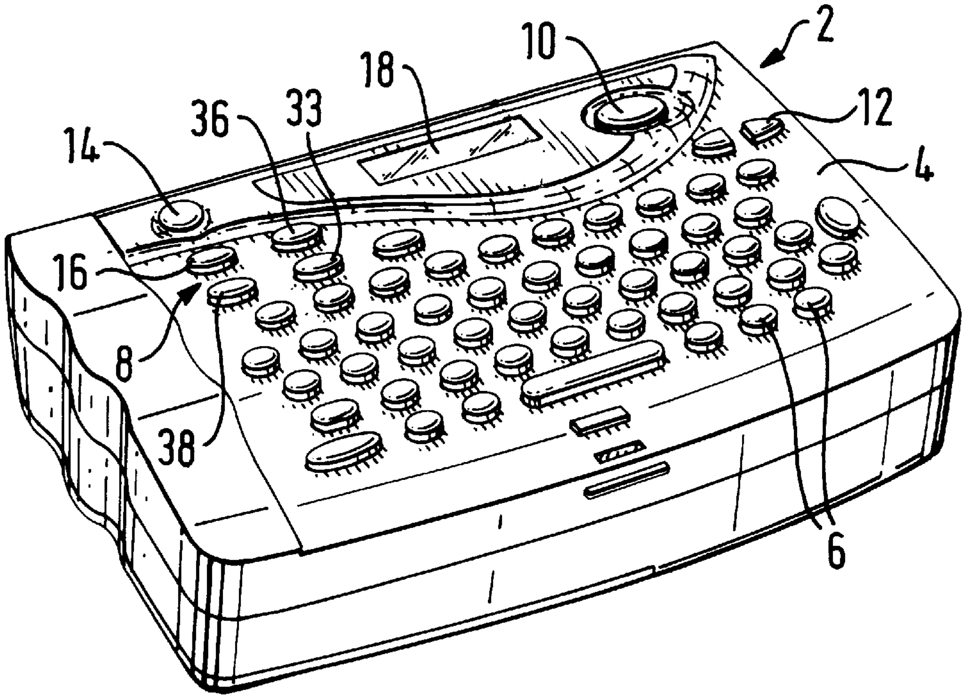
FIG. 1 is a plan view showing the front of a tape printing apparatus.

FIG. 1 shows a simplified plan view of a tape printing apparatus 2. The tape printing apparatus comprises a keyboard 4. The keyboard 4 has a plurality of data entry keys and in particular comprises a plurality of numbered, lettered and punctuation keys 6 for inputting data to be printed as a label and function keys 8 for editing the input data. These function keys 8 are arranged for example to change the size or font of the input data. Additionally, these function keys 8 also allow, amongst other functions, underlining and boxing of the label to be achieved. The keyboard 4 also comprises a print key 10 which is operated when it is desired that a label be printed as well as tape feeding keys 12. Additionally, the keyboard 4 also has an on/off key 14 for switching the label printing apparatus 2 on and off. Finally, a user key 16, as will be described in more detail hereinafter, is provided to assist users of the tape printing apparatus 2 to store personalized label settings and symbols.

The tape printing apparatus 2 also has a liquid crystal display (LCD) 18 which displays the data as it is entered. The display 18 allows the user to view all or part of the label to be printed which facilitates the editing of the label prior to its printing. Additionally, the display 18 can also display messages to the user, for example, error messages or an indication that the print key 10 should be pressed. The display 18 is driven by a display driver 28 which can be seen in FIG. 3.

Figure 2:
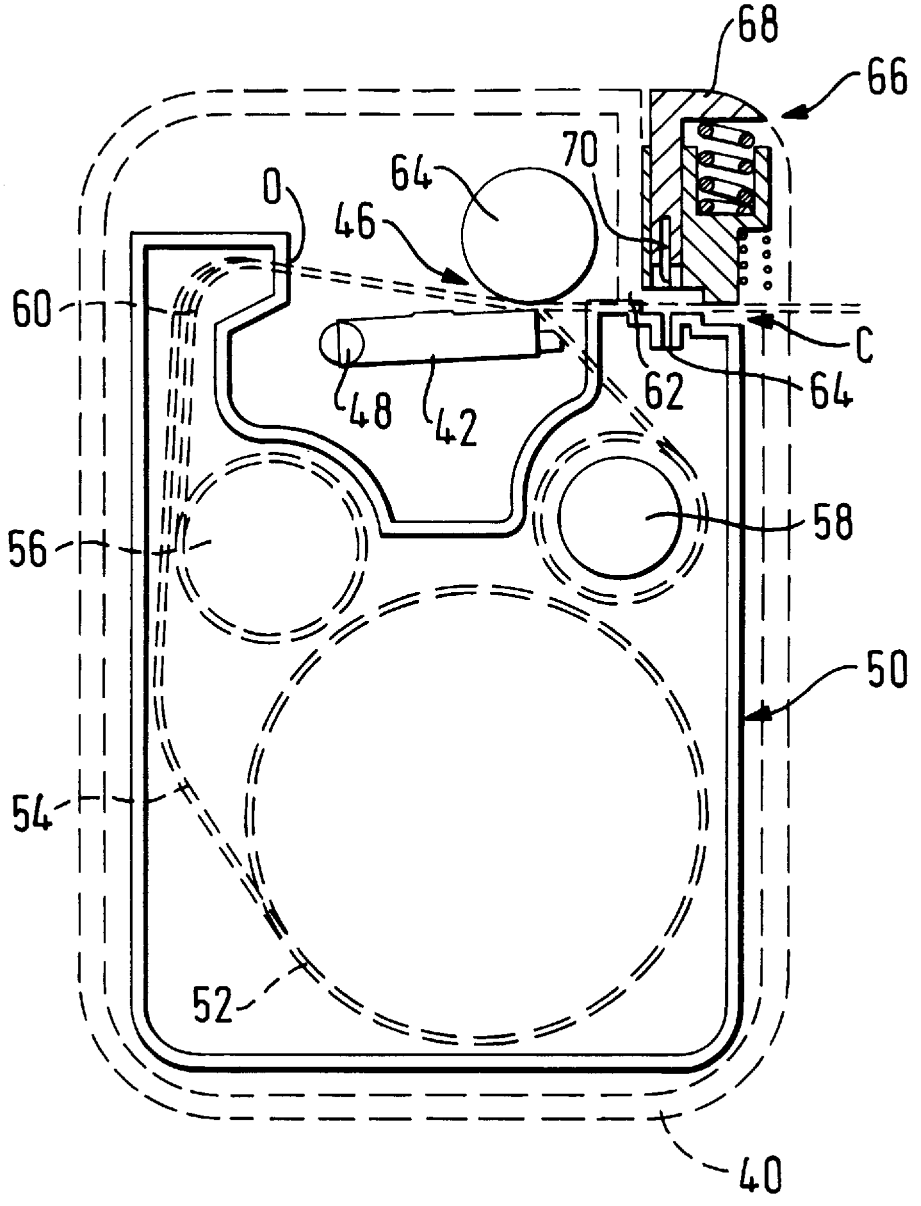
FIG. 2 is a plan view of the underside of the tape printing apparatus of FIG. 1.

On the underside of the tape printing apparatus 2 which can be seen from FIG. 2, there is a cassette receiving bay 40. The cassette receiving bay 40 includes a thermal print head 42 and a platen 44 which cooperate to define a print zone 46. The print head 42 is pivotable about a pivot point 48 so that it can be brought into contact with the platen 44 for printing and moved away from the platen 44 to enable a cassette to be removed and replaced. A cassette inserted into the cassette bay 40 is denoted generally by reference numeral 50. The cassette 50 holds a supply spool 52 of image receiving tape 54. The image receiving tape 54 comprises an upper layer for receiving a printed image on one of its surfaces and has its other surface coated with an adhesive layer to which is secured a releasable backing layer. The image receiving tape 54 is guided by a guide mechanism (not shown) through the cassette 50, out of the cassette 50 through an outlet O, past the print zone 46 to a cutting location C. The same cassette 50 also has an ink ribbon supply spool 56 and ink ribbon take up spool 58. The image receiving tape 54 and the ink ribbon 60 are arranged to pass in overlap between the print head 42 and the platen 44. In particular, the image receiving layer of the image receiving tape 54 is in contact with the ink ribbon 60.

The platen 44 is driven by a motor 30 (see FIG. 3), for example a dc motor or a stepper motor so that it rotates to drive the image receiving tape 54 in a direction which is parallel to the lengthwise extent of the image receiving tape through the print zone 46. In this way, an image is printed on the image receiving tape 54 and the image receiving tape 54 is fed from the print zone 46 to the cutting location C which is provided at a location on a portion of the wall of the cassette 50 which is close to the print zone 46. The portion of the wall of the cassette 50 where the cutting location C is defined is denoted by reference 62. A slot 64 is defined in the wall portion 62 and the image receiving tape 54 is fed past the print zone 46 to the cutting location C where it is supported by facing wall portions on either side of the slot 64.

A cutting mechanism 66 is provided and includes a cutter support member 68 which carries a blade 70. The blade 70 cuts the image receiving tape 54 and enters the slot 64.

In those embodiments where the motor 30 is a dc motor, the image receiving tape 54 is driven continuously through the print zone 46 during printing. Alternatively, in those embodiments where the motor is a stepper motor, the platen 44 rotates stepwise to drive the image receiving tape 54 in steps through the print zone 46 during the printing operation.

The print head 42 is a thermal print head comprising a column of a plurality of printing elements. The print head 42 is preferably only one printing element wide and the column extends in a direction perpendicular to the lengthwise direction of the image receiving tape 54. The height of the column of printing elements is preferably equal to the width of the image receiving tape 54 to be used with the label printing apparatus 2. Where more than one width of image receiving tape 54 is used, the print head column will generally have a height equal to the largest width of tape 54. An image is printed on the image receiving tape 54 column by column by the print head 42. It should be appreciated that an image can be printed on the image receiving tape via the ink ribbon 60. Alternatively if the image receiving tape 54 is of a suitable thermally sensitive material, an image can be applied directly by the print head 42 to the image receiving tape.

As an alternative to the one cassette system shown in FIG. 2, the cassette receiving bay may be arranged to receive a separate image receiving tape cassette and a separate ink ribbon cassette which are arranged so that the ink ribbon and image receiving tape are passed in overlap through a print zone. This particular cassette arrangement is described for example in U.S. patent application Ser. No. 08/069,256 the content of which are herein incorporated by reference. Any other suitable arrangement for providing a supply of image receiving tape can of course be used with embodiments of the present invention.

Figure 3:
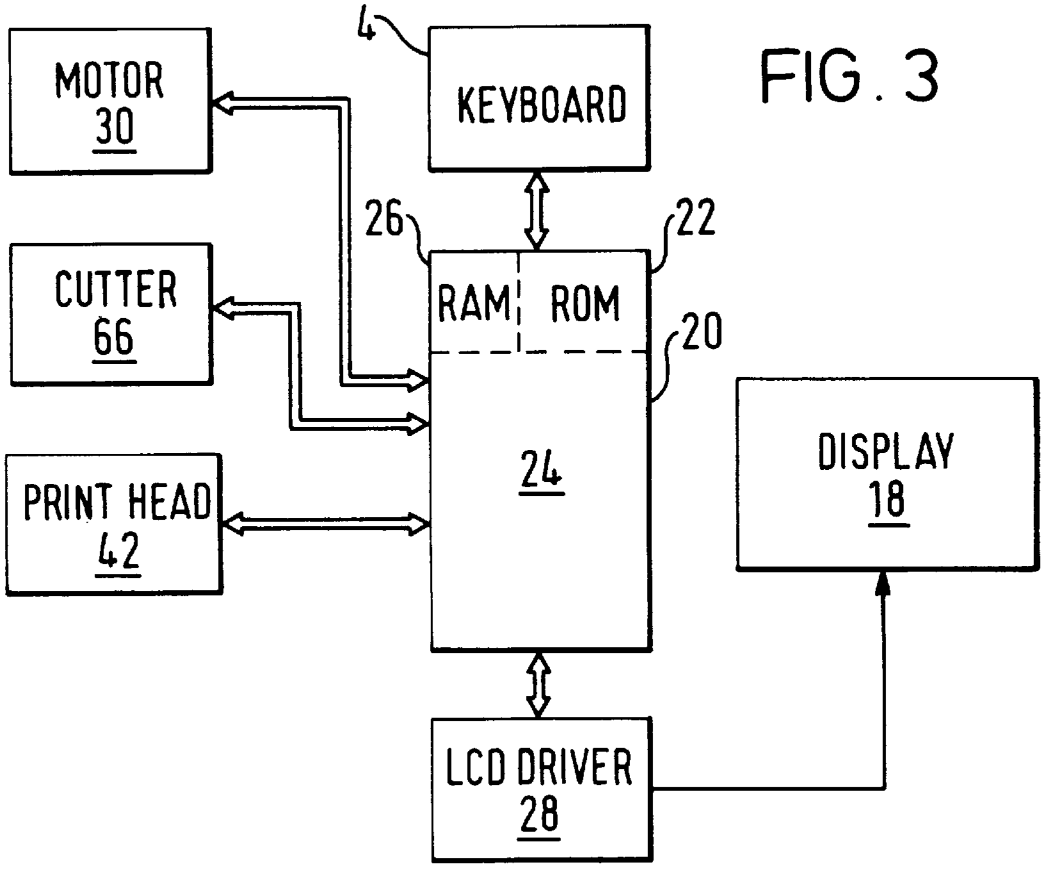
FIG. 3 is a simplified block diagram of control circuitry for controlling the tape printing apparatus of FIG. 1.

FIG. 3 shows the basic control circuitry for controlling the tape printing apparatus 2 of FIGS. 1 and 2. There is a microprocessor chip 20 having a read only memory (ROM) 22, a microprocessor 24 and random access memory capacity indicated diagrammatically by RAM 26. The microprocessor 24 is controlled by programming stored in the ROM 22 and when so controlled acts as a controller. The microprocessor chip 20 is connected to receive label data input to it from the keyboard 4. The microprocessor chip 20 outputs data to drive the display 18 via the display driver chip 28 to display a label to be printed (or a part thereof) and/or a message or instructions for the user. Additionally, the microprocessor chip 20 also outputs data to drive the print head 42 which prints an image onto the image receiving tape 54 to form a label. Finally, the microprocessor chip 20 also controls the motor 30 for driving the image receiving tape 54 through the tape printing apparatus 2. The microprocessor chip 20 may also control the cutting mechanism 66 to allow lengths of image receiving tape 54 to be cut off after an image has been printed thereon.

The tape printing apparatus 2 allows labels to be composed and displayed on the display 18 using the various keys. In particular, the ROM 22 stores information relating to alphanumeric characters and the like which are associated with respective ones of keys 6 as well as information relating to the functions associated with the function keys 8. When a key 6 is depressed, data concerning the associated character or the like is retrieved from the ROM 22 and then stored in the RAM 26. The data stored in the RAM 26 may be in the form of a code which identifies the character. The microprocessor 24, in accordance with the data stored in the RAM 26 generates pixel data which is transmitted in one form column by column to the print head 42 and to the display 18 in another form. Additionally data concerning a function may be retrieved from the ROM 22 in response to activation of one or more of the function keys 8. That data may take the form of a flag. The pixel data generated by the microprocessor 24 and sent to the print head 42 and the display 18 will take into account the data relating to one or more functions stored in the RAM 26. As will be appreciated, the keys 6 and 8 of the keyboard 4 have predetermined functions associated therewith which causes predetermined data associated with that function to be retrieved from the ROM 22.

The user is able to vary the label attributes and character attributes of the label to be printed using the function keys 8. The attributes relating to the characters and the label itself can be included in the data defining the text of a label as it is entered via the keyboard 4. Alternatively, the input text can first be entered via the keyboard 4 and then subsequently manipulated using the function keys 8 so as to provide the desired label settings having the desired label attributes and character attributes. In both cases, information defining the label to be printed is stored temporarily in the RAM 26.

Label attributes include the layout of the label, underlining, boxing, orientation of the characters with respect to the image receiving tape, label length, label format and the like. Character attributes include character sizes, character styles such as fonts, bolding, italics and capitalization, and the like. The term character is used broadly to describe alphanumeric characters, punctuation marks and in certain circumstances symbols. A number of these label and character attributes are selected using menus. For example, when the function key 8 relating to text size is activated or depressed, a menu with the various size options is displayed. To select the required size option the user moves a cursor through the menu until the desired size is indicated. The desired character size can be selected by pressing the associated function key 8 again. This would remove the menu from the display 18 and cause a flag to be stored in the RAM 26 in accordance with the selected size attribute. Where a large number of different attributes relating to the label and the characters are required by the user, the selection of the desired label settings can be a relatively time consuming process.

Figure 4:
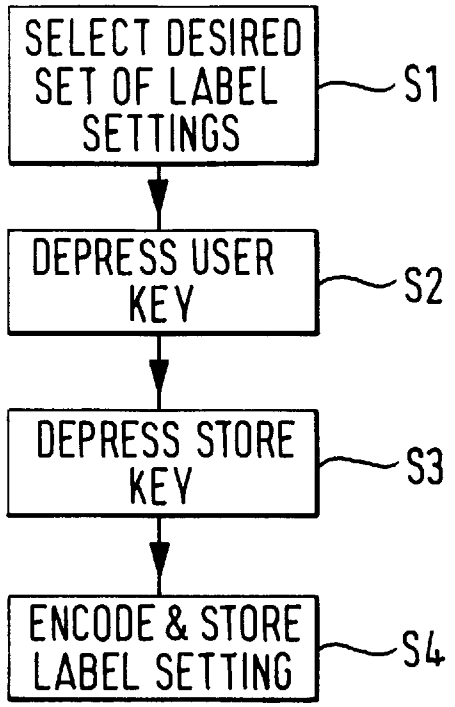
FIG. 4 is a flow chart illustrating the selection and storage of a set of attributes.
Figure 5:
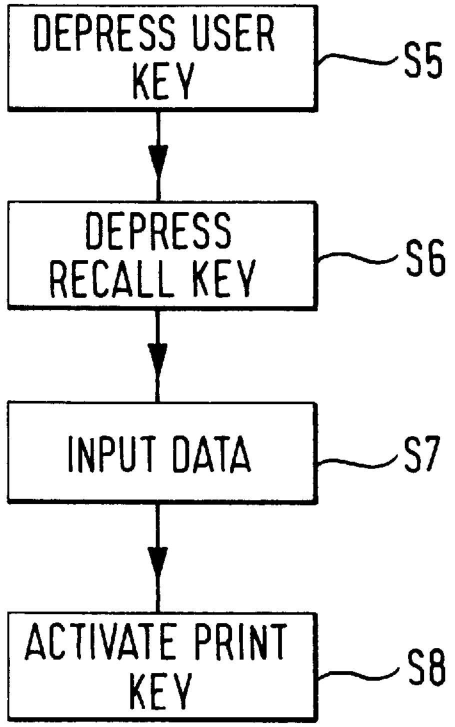
FIG. 5 is a flow chart illustrating the retrieval of the selected set of attributes.

Reference will now be made to FIGS. 4 and 5 which illustrate how a selection of label and/or character attributes can be made and stored for easy retrieval by the user. This is particularly advantageous where a particular set of label settings (which may include both label and character attributes) is frequently used by the user.

Reference will now be made to step S1 of FIG. 4 in which a set of desired settings for a label is selected. As will be appreciated, the set of desired label settings selected by the user can be chosen in accordance with each user's individual needs and preferences which makes embodiments of the invention flexible. These settings can include label attributes and/or character attributes. These attributes are selected in the usual way by use of the function keys 8. Depending on the attributes selected, this may involve the selection of particular attributes from menus, as outlined above. As already discussed data relating to the various possible attributes for the label and characters are stored in the ROM 22. Activation of selected function keys 8 of the keyboard 4 causes the microprocessor 24 to retrieve data from the ROM 22 relating to the attributes selected by activation of the keys 8 of the keyboard 4. The microprocessor 24 causes data relating to the selected attributes to be stored in the RAM 26. These attributes are stored in the RAM 26 in the form of a sequence of bytes containing data defining attributes of the characters to be included in the label and/or label attributes.

If it is desired to store the selected set of attributes, the user key 16 is depressed in step S2. A store key 33 (one of the function keys 8) is depressed in step S3 to confirm that the selected set of label settings are to be stored. These set of label settings are then encoded and stored in the RAM 26 (step S4) under the control of the microprocessor 24. The current label settings are thus stored when the store key 33 is depressed. The current label settings may thus replace any previously stored settings.

The label printing apparatus 2 can be used in a normal mode of operation to print a variety of labels with different label and character attributes selected for each individual label as desired by the user. When the user wishes to use the stored set of selected label settings, the steps shown in FIG. 5 are carried out. Firstly, in step S5, the user key 16 is depressed to thereby activate that key. In step S6, a recall key 36 which is one of the function keys 8, is depressed. Activation of the recall key 36 causes data relating to the selected set of label settings to be in the working part of the random access memory 26. When the recall key 36 is depressed, information relating to the various stored attributes are displayed. A character size menu may be displayed on the display and any annunciators on the display which need changing are changed to reflect the stored attributes. Annunciators indicate to the user which attributes have been selected such as which font, size, etc. The user has to activate a key such as the return key to remove the menu. If the delete key is alternatively activated, the earlier current label settings will be left unchanged.

The user, in step S7, inputs data via the data entry keys 6, for example in the form of a text to be printed. As in the normal mode of operation, data relating to the input text is retrieved from the ROM 22 and then stored in the RAM 26. In step S8, the print key 10 is activated. This results in the microprocessor 24 then generating pixel data to be sent to the display 18 and the printhead 42 which takes into account the input text data stored in the RAM 26 as well as the data relating to the selected set of attributes.

The label printing apparatus 2 is then ready for the next label to be printed. The data relating to the selected set of attributes itself is unchanged by being recalled by the user and can be retrieved subsequently by the user as and when required in the manner outlined above. It should be appreciated that the desired label attributes remain in the storage area of the memory and are unchanged. In particular when the recall key 36 is activated, the stored set of label attributes are copied into the working part of the memory but also remain unchanged in the storage part of the memory. The input text can, in some embodiments of the invention be input prior to the recalling of the data relating to the selected set of label settings. The resulting label which is printed would also have the required label settings.

Thus, in order to recall a desired set of attributes which have been previously selected by the user, only two keys are required to be depressed. This may be a considerable reduction in the number of key strokes as compared to the number which could be required if the selected set of label settings were to be re-selected each time a label having those settings was required.

In general, each of the numbered, lettered and punctuation keys 6 is associated with one or two symbols (characters, numbers, punctuation marks, icons, etc.). However, tape printing apparatus 2 generally has a table of a large number of symbols which can also be printed by the tape printing apparatus 2. These symbols are not specifically associated with the respective numbered, lettered or punctuation keys 6. Rather, to retrieve a symbol in the symbol table, it is necessary to call up the table using the associated symbol key 38 which is one of the function keys 8. The user then has to move a cursor through the symbol table in order to find the required symbol. As such tables often have over a hundred different symbols, this can be a relatively time consuming process and frustrating for the user if a particular symbol is often used. Accordingly, embodiments of the present invention permit a user to select one or more symbols from the symbol table and cause those selected symbols to be associated with a particular key or keys of the keyboard 4.

Figure 6:
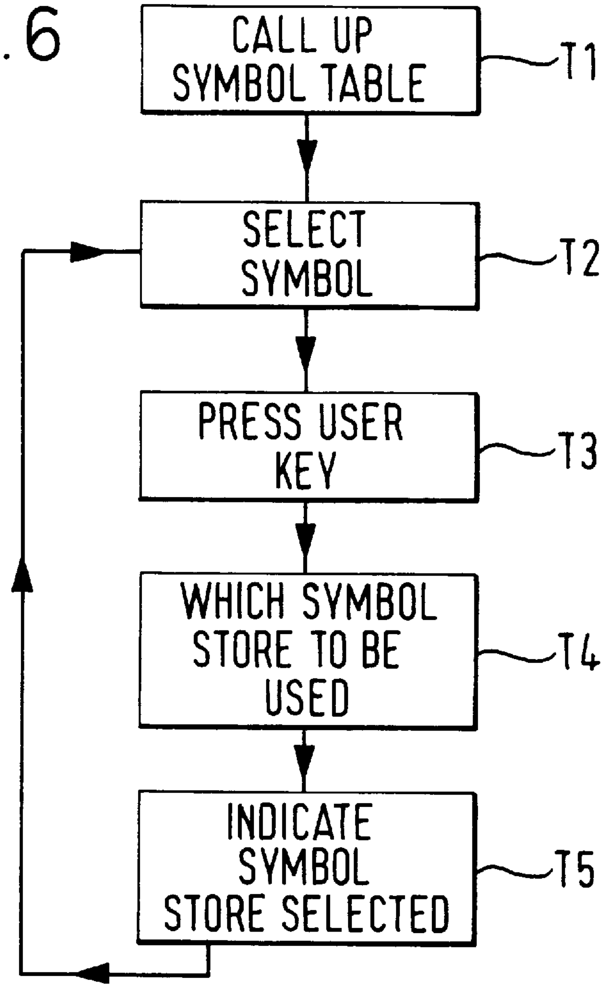
FIG. 6 is a flow chart illustrating the selection and storage of a particular symbol.
Figure 7:
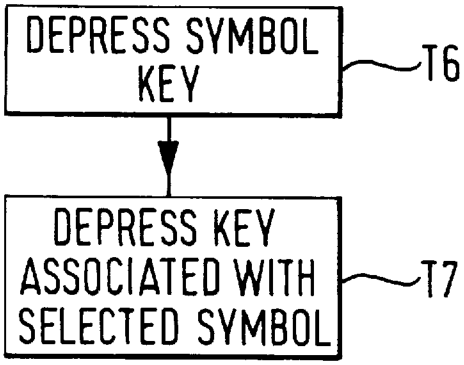
FIG. 7 is a flow chart illustrating the retrieval of the stored symbol.

In this regard, reference is made to FIGS. 6 and 7. In particular, the various steps required in order to select the symbols from the symbol table and to associate them with particular keys is described with reference to FIG. 6. In the first step T1, the symbol table is called up in the normal way by activation of the symbol key 38. The display appears with the message "a–n". The user then activates any of the alphanumeric keys a to n and the various symbols associated with the activated alphanumeric key are displayed. In step T2, the user selects a symbol which is to be associated with a particular key, in the normal manner. In particular, a cursor is moved until the desired symbol associated with the selected alphanumeric key is highlighted. Normally to select that symbol, the return key or symbol key 38 is activated.

However, in the user mode, in step T3, the user key 16 is pressed when the cursor is over the selected symbol. The user is asked in step T4 as to which of the available symbol stores are to be used. In this embodiment of the present invention, there are nine available symbol stores which are associated with the number keys 1 to 9. It will be appreciated that the user may be interrogated by the display of a question on the display 18. In step T5, the user indicates which of the available stores are to be used by pressing for example the key 6 for number "1" if the selected symbol is to be associated with the number key "1". These steps can be repeated so as to store selected symbols at the eight remaining symbol stores. Data associated with the selected symbol is retrieved from the ROM 22 and then stored in the RAM 26. Additionally, information which associates the selected symbols with the selected number key (symbol store) is stored in the RAM 26. Once this step is completed the user is returned to step T2 so that if required a further symbol can be selected for association with a particular key.

Reference is made to FIG. 7. To retrieve a user selected symbol, in step T6, the user enters the symbol mode by pressing the symbol key 38 which results in the symbol table being called up. In step T7 the number key associated with the desired selected symbol is pressed to retrieve data relating to the selected symbol which is stored in the RAM 26. The symbol table is at the same time removed from the display 18. In this way the selected symbol can be retrieved with only two key strokes as compared to the many more which may be required to retrieve a symbol from the symbol table. The symbol is retrieved into an input string of text at the location of the cursor at the time that the user activates the symbol key 38 in step T6.

In the particular embodiment described above, only one set of label settings is selectable to be associated with the recall key 36. In order to change the set of selected label settings, the steps described in relation to FIG. 4 are carried out again. The new set of label settings will then replace the previous set of label settings. However, it will be appreciated that in certain embodiments of the invention, more than one set of label settings c an be selected and stored. In these embodiments, a set of label stores can be provided, in a similar way to those provided for the selected symbols. In certain embodiments of the invention, the selected sets of label settings can be accessed via a menu. Where the set of selected label settings include a number of different attributes, the use of a menu can still result in a reduction in the number of key strokes required to obtain a desired set of label settings.

As regards the selection of the selected symbols to be associated with predetermined keys, it will be appreciated that in order to change a selected symbol associated with a given symbol store or number key, the steps described in relation to FIG. 6 are repeated.

As will be appreciated, the various store, recall and user keys may have other functions in the normal mode of operation of the tape printing apparatus. The required store and recall functions can be obtained in a user determined mode by activation of the user key.

What is claimed is:

1. A label printing device for printing an image on an image receiving medium comprising:

a printing mechanism;

a keyboard having a user key and a plurality of data entry keys for entering data for controlling the printing mechanism, said data entry keys providing a plurality of different label settings storage means for holding data accessible in response to said data entered at the keyboard;

a controller, operatively connected to the print mechanism to define an image to be printed on said image receiving medium using the stored data said controller operating selectively in one of a plurality of modes of operation to define the image, said modes including:

a normal mode of operation in which at least some of the keys have predetermined functions associated therewith to access predetermined data associated with the predetermined functions;

a user determination mode entered by activation of the user key in which the user uses said keyboard to define a user function associated with one or more of said data entry keys so that user defined data is held in the storage means to implement said user function, said user defined data defining a set of label settings selected by the user in said user determination mode, said set of label settings comprising a subset of the plurality of label settings available via said data entry keys; and a user defined mode in which said data entry keys define a label to be printed in accordance with the user defined data.

2. The label printing device as claimed in claim 1, wherein the controller comprises process means for altering in a user defined mode the input data entered via said data entry keys in accordance with said selected set of label settings.

3. The label printing device as claimed in claim 1, wherein said set of label settings comprises a plurality of label attributes and/or character attributes.

4. The label printing device as claimed in claim 3, wherein said label attributes includes at least one of the following attributes:

label layout; underlining; boxing; orientation of characters with respect to the image receiving medium; label length and label format.

5. The label printing device as claimed in claim 3, wherein said character attributes include at least one of the following attributes:

font; character style; character size; and capitalization.

6. The label printing device claimed in claim 1, wherein the controller in said user determination mode causes the user defined function to be stored in said storage means on activation of a store key.

7. The label printing device claimed in claim 6, wherein the controller, when in the user defined mode, recalls the user function stored in the storage means in response to activation of a recall key, the recall key being different from said store key.

8. A method of defining a user function in a printing device, said method comprising the steps of:

activating a user key of a keyboard of the printing device to define a user determination mode;

activating one or more data entry keys of the keyboard to define a user function associated with one or more data entry keys of the keyboard, said user function comprising the selection by the user of a set of a label settings, said set of label settings comprising a subset of a plurality of label settings available via said data entry keys;

storing user defined data associated with the activated data entry keys in storage means of the printing device to implement the user function;

activating said data entry keys to define a user defined mode, wherein said data entry keys are operable to define a label to be printed in accordance with the user defined data; and printing the label on an image receiving medium.

9. A label printing device for printing an image on an image receiving medium comprising:

a printing mechanism for printing the image on the image receiving medium;

a keyboard having a plurality of keys for inputting data to generate the image, the keys including:

a plurality of data entry keys, each of a first plurality of data entry keys having a set of character data associated therewith and each of a second plurality of data entry keys having a set of attribute data associated therewith; and a user key to activate one of a plurality of modes including a user defined mode, wherein the user defined mode allows a plurality of sets of data to be associated with one of the plurality data entry keys;

storage, means for storing the data sets associated with each of the plurality of keys;

a print key; and a controller for controlling and causing the printing mechanism to print the image on the image receiving medium in response to the print key.

10. The label printing device according to claim 9, wherein the attribute data includes label attributes and character attributes.

11. The label printing device according to claim 10, wherein the label attribute data includes one of the following attributes:

label layout, underlining, boxing, orientation of characters with respect to the image receiving medium, label length, and label format.

12. The label printing device according to claim 10, wherein the character attributes includes at least one of the following attributes:

font, character style, character size, and capitalization.

13. A label printing device for printing an image on an image receiving medium comprising:

a printing mechanism for printing the image on the image receiving medium;

a keyboard having a plurality of keys for inputting data to generate the image, the keys including:

a plurality of data entry keys including at least one symbol key having a plurality of individually selectable symbols associated therewith; and a user key to activate one of a plurality of modes including a user defined mode, wherein the user defined mode allows a plurality of sets of symbol data corresponding to the individually selected symbols to be associated with one of the plurality data entry keys;

storage means for storing the symbol data sets associated with the data entry key;

a print key; and a controller for controlling and causing the printing mechanism to print the image on the image receiving medium in response to the print key.

14. A method of printing a label in a label printing device, said method comprising the steps of:

activating a user key of a keyboard of the printing device to define a user determination mode;

activating one or more entry keys of the keyboard to associate a plurality of label settings with one key of the keyboard, each of the label settings having data associated therewith;

storing the data associated with each of the plurality of selected label settings;

composing the label using data entry keys on the keyboard;

activating, in a user defined mode, the entry key having a plurality of settings associated therewith to retrieve the stored data for the plurality of label settings from the storage means; and printing the label on an image receiving medium using the user selected label settings.

15. A method of printing a label in a label printing device, said method comprising the steps of:

activating a user key of a keyboard of the printing device to define a user determination mode;

activating a symbol key of said keyboard, said symbol key having a plurality of individually selectable symbols associated therewith, the symbols having data associated therewith;

selecting at least one of said individually selectable symbols;

storing in a storage means of the printing device the data associated with each of the selected symbols for association with a single key on the keyboard;

composing the label using data entry keys on the keyboard;

activating the single key on the keyboard to cause the data associated with the at least one selected symbols to be retrieved from the storage means; and printing the label on image receiving medium using the retrieved data.

* * * * *